US009096228B2

(12) United States Patent
Stahlin et al.

(10) Patent No.: US 9,096,228 B2
(45) Date of Patent: Aug. 4, 2015

(54) METHOD AND SYSTEM FOR ACCELERATED OBJECT RECOGNITION AND/OR ACCELERATED OBJECT ATTRIBUTE RECOGNITION AND USE OF SAID METHOD

(75) Inventors: Ulrich Stahlin, Eschborn (DE); Matthias Komar, Frankfurt (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 167 days.

(21) Appl. No.: 13/806,490

(22) PCT Filed: Jun. 22, 2011

(86) PCT No.: PCT/EP2011/060470
§ 371 (c)(1), (2), (4) Date: Mar. 8, 2013

(87) PCT Pub. No.: WO2011/161176
PCT Pub. Date: Dec. 29, 2011

(65) Prior Publication Data
US 2013/0158852 A1 Jun. 20, 2013

(30) Foreign Application Priority Data

Jun. 23, 2010 (DE) .......................... 10 2010 030 455

(51) Int. Cl.
*G08G 1/16* (2006.01)
*G06K 9/62* (2006.01)
(Continued)

(52) U.S. Cl.
CPC .............. *B60W 30/09* (2013.01); *G01M 17/00* (2013.01); *G06K 9/00805* (2013.01); *G06K 9/6289* (2013.01); *G08G 1/163* (2013.01); *G08G 1/164* (2013.01)

(58) Field of Classification Search
CPC .. G06K 9/00791; G06K 9/6289; G08G 1/163

USPC ..................................... 701/301; 180/167, 169
See application file for complete search history.

(56) References Cited

U.S. PATENT DOCUMENTS 7,813,843 B2 * 10/2010 Patel et al. ........................ 701/1
2008/0167774 A1 7/2008 Patel et al.

FOREIGN PATENT DOCUMENTS

DE   10 2004 038 494 A1   3/2006
DE   10 2007 049 516 A1   4/2008
(Continued)

OTHER PUBLICATIONS

Lidstrom et al. "Safety Considerations for Cooperating Vehicles Using Wireless Communication", 5th IEEE International Conference on Industrial Informatics (2007), pp. 995-1000.*
(Continued)

*Primary Examiner* — John R Olszewski
*Assistant Examiner* — Todd Melton
(74) *Attorney, Agent, or Firm* — Brinks Gilson & Lione

(57) ABSTRACT

A method for accelerated object detection or for accelerated object attribute detection, wherein a first information item is acquired by a vehicle-to-X communication device, and describes at least one object or at least one object attribute in an evaluated data form. A second information item is acquired by at least one individual sensor or by a sensor group, and describes the at least one object or the at least one object attribute in sensor raw data form, and an object detection algorithm and/or an object attribute detection algorithm is applied to sensor raw data of the second information item. The method is defined in that a threshold value of the object detection algorithm or of the object attribute detection algorithm for detecting the at least one object or at least one object attribute described by the first information item is reduced in the sensor raw data of the second information item.

16 Claims, 3 Drawing Sheets

(51) Int. Cl.
  *B60W 30/09* (2012.01)
  *G01M 17/00* (2006.01)
  *G06K 9/00* (2006.01)

(56) References Cited

FOREIGN PATENT DOCUMENTS

| DE | 10 2007 048 809 A1 | 7/2008 |
|----|--------------------|--------|
| DE | 10 2007 012 458 A1 | 9/2008 |
| DE | 10 2008 013 366 A1 | 9/2009 |
| DE | 10 2010 022 093 A1 | 12/2011 |
| EP | WO 2004/085220 A1 | 10/2004 |
| EP | WO 2009/071345 A1 | 6/2009 |
| FR | 2 896 594 | 7/2007 |
| WO | WO 03/001474 A2 | 1/2003 |

OTHER PUBLICATIONS

German Examination Report—Feb. 13, 2012.
PCT International Search Report—Oct. 20, 2011.
S. Wender, K. Dietmayer, 3D vehicle detection using a laser sanner and a video camera, IET Intelligent Transport System, Jun. 6, 2008, pp. 105-112, vol. 2, No. 2, Ulm, Germany.
P. K. Varshney, Multisensor data fusion, Electronics and Communication Engineering Journal, Dec. 1, 1997, pp. 245-250, USA.

* cited by examiner

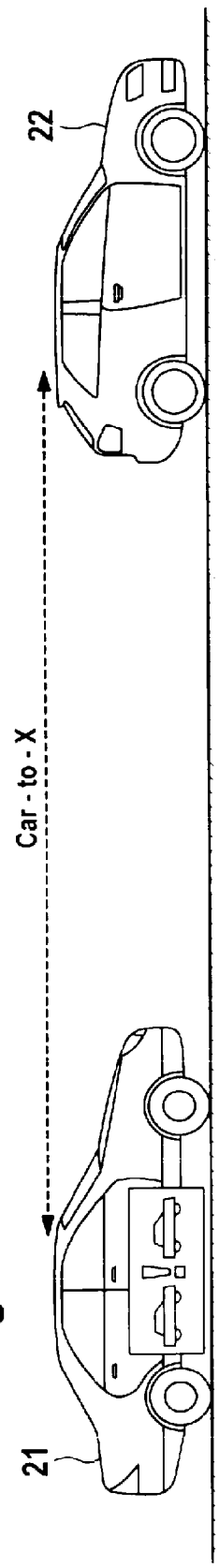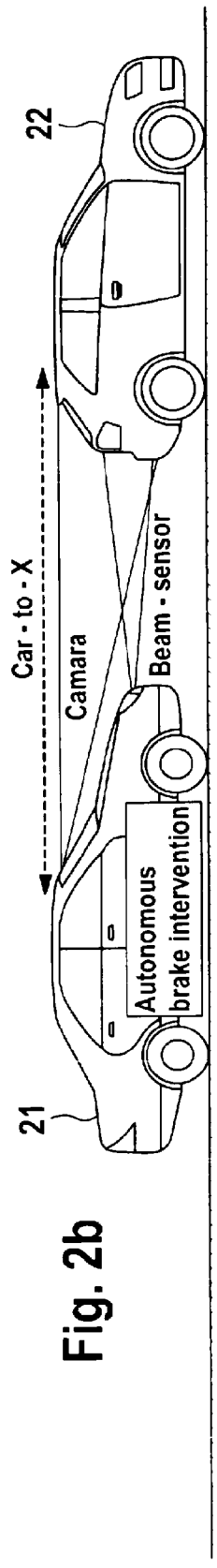

METHOD AND SYSTEM FOR ACCELERATED OBJECT RECOGNITION AND/OR ACCELERATED OBJECT ATTRIBUTE RECOGNITION AND USE OF SAID METHOD

CROSS-REFERENCE TO RELATED APPLICATIONS

This application claims priority to German Patent Application No. 10 2010 030 455.7, filed Jun. 23, 2012 and PCT/EP2011/060470, filed Jun. 22, 2011.

FIELD OF THE INVENTION

This invention relates to a method for accelerated object detection and/or for accelerated object attribute detection particularly for motor vehicle applications, and the use of said method and a system for accelerated object detection and/or for accelerated object attribute detection.

BACKGROUND AND DISCUSSION OF FEATURES OF THE INVENTION

A multiplicity of different sensor systems for sensing the surroundings has already been disclosed in the prior art. It is also already known to obtain and transmit information about the vehicle surroundings via telematics systems which communicate in a wireless fashion. Under certain conditions and when these systems are sufficiently reliable, the acquired information can be used for interventions in the vehicle control, for example in the form of an autonomous emergency braking operation.

In this context, WO 2004/085220 discloses, for example, an electronic control system for a vehicle and a method for determining an intervention in a vehicle system, independently of the driver. In this context, a driver's request module firstly determines a driver's request from the brake pedal travel, from transfer movements between the pedals and from the brake pressure in the brake system. A hazard computer subsequently determines the hazard potential which is present, by evaluating the driver's request and evaluating further data such as surroundings sensor data. Furthermore, the electronic control system is also connected to various autonomously operating assistance systems. The driver's request data and the surroundings data are evaluated by the hazard computer and corresponding request commands are output to the individual assistance systems. The request commands relate here both to passive and to active safety. A vehicle control intervention can therefore be carried out as a function of the detected hazard potential.

WO 2009/071345 A1 describes a central control unit for a plurality of assistance systems which are provided in a motor vehicle, at least one assistance system of which is equipped with surroundings sensors. The central control unit connects the individual assistance systems and logically combines the sensor information items obtained from the assistance systems with one another in order to subject non-redundant sensor information items to analytical checking and plausibility testing. In addition, it is possible, for example in the case of a camera, to check the sensor information by comparing it with sensor information from the same sensor which has been acquired later. If the camera captures the same object over a specific time frame, or over a plurality of measurement cycles, the validity of the existence of said object can be considered to have been checked. Furthermore, there is a description of the possibility of using a surroundings sensor to check the validity of an information item received via vehicle-to-X communication or of receiving an information item whose plausibility has already been tested by means of an extraneous transmitter.

The non-published document DE 10 2010 031 466 A1 describes a method for checking the validity of information which has been acquired by means of vehicle-to-X communication, without involving a surroundings sensor for checking the validity of the received information. For this purpose, the position information of the transmitter, contained in the vehicle-to-X information item, is compared with position information of the transmitter which is calculated by the receiver itself when the message is received. In order to be able to calculate the position of the transmitter, a transmitter validity-checking device with at least two antennas is also described, said antennas having a different geometry or a different material composition or at least being arranged at different mounting locations on the vehicle. By comparing the field strengths received in the individual antennas it is possible to draw a conclusion about the actual position of the transmitter and therefore to check the validity thereof, if appropriate. However, if the calculated position deviates from the position transmitted by means of vehicle-to-X communication, the entire content of the received vehicle-to-X information is rejected as unreliable.

A disadvantage of the methods according to the prior art is that a safety-relevant vehicle-to-X information item cannot be used for intervention into the vehicle control in order to avoid an accident until said information item has previously been subjected to a comparatively lengthy validity-checking process. According to the prior art, the validity checking can be performed by means of surroundings sensors or by means of a comparison of the received field strengths. If the validity of the received vehicle-to-X information item is checked by means of position determination of the transmitter on the basis of the received field strengths, it is necessary firstly to receive a series of vehicle-to-X information items from the same transmitter before the position of said transmitter can be determined with adequate precision. As a result, a time period which is, under certain circumstances, critical passes unused before an autonomous intervention in order to avoid an accident can be made in the vehicle control. Likewise, reliable detection of a situation by means of a surroundings sensor generally requires a plurality of measurement cycles and processing cycles before the surroundings sensor data is available for the validity checking of the vehicle-to-X information. As a result, a time period which is, under certain circumstances, critical for avoiding an accident also passes here without being used. Since the validity of a vehicle-to-X information item is checked by means of surroundings sensors in most application cases, there is therefore a particular requirement for a method for rapid object detection by means of surroundings sensors.

The invention is therefore based on the object of proposing a method and a system which permit accelerated object detection and/or accelerated object attribute detection by means of a surroundings sensor.

This object is achieved according to the invention by means of the method for accelerated object detection and/or for accelerated object attribute detection according to this invention, and the system for accelerated object detection and/or for accelerated object attribute detection.

According to the inventive method for accelerated object detection and/or for accelerated object attribute detection, a first information item is acquired by a vehicle-to-X communication device, wherein the first information item describes at least one object and/or at least one object attribute in an evaluated data form, and a second information item is acquired by at least one individual sensor or by a sensor group, wherein the second information item describes the at least one object and/or the at least one object attribute in sensor raw data form. An object detection algorithm and/or an object attribute detection algorithm is applied to sensor raw data of the second information item. The method according to the invention is defined by the fact that a threshold value of the object attribute detection algorithm and/or of the object detection algorithm for detecting the at least one object and/or at least one object attribute described by the first information item is reduced in the sensor raw data of the second information item.

The term sensor raw data is understood within the scope of the invention to mean all unevaluated signals which are output by different surroundings sensors for evaluation. On the other hand, the term evaluated data form within the scope of the invention refers to the already evaluated sensor raw data of the different surroundings sensors and to the data form of all the information items transmitted by means of vehicle-to-X communication. In an evaluated data form, objects and object attributes are described in such a way that they can be processed immediately by driver assistance systems and other vehicle devices without further data format conversion or evaluation processes.

The method therefore provides the advantage that the validity of a first information item which has been acquired by means of a vehicle-to-X communication device can be comparatively quickly checked by means of an individual sensor or a sensor group, since the object detection or object attribute detection is carried out comparatively quickly by the individual sensor or the sensor group on the basis of the reduced threshold values. The information whose validity has been checked can be made available to various, even autonomously operating driver assistance systems, on the basis of the high level of reliability of said information. The driver assistance systems can in turn use the information whose validity has been checked for, for example, intervention in the vehicle control in order to avoid an accident. Likewise, information can, however, also be used as a reliable basis for outputting a warning to the driver.

There is preferably provision that the object detection algorithm detects the existence of an object and/or the object attribute detection algorithm detects a direction of movement and/or a relative and/or absolute position and/or a speed and/or a type of the object. This provides the advantage that an object is firstly detected as existing by means of the object detection algorithm. This is a fundamental information item for the assessment of a situation which is present and for possible reactions of different driver assistance systems. The position of a detected object is also of equal importance for the assessment of a situation which is present. This is the only way in which it is possible to assess whether or not a detected object constitutes a potential hazard. If the direction of movement and the speed of the object are additionally known by virtue of the object attribute detection algorithm, the assessment of the situation can be improved to the effect that a possible hazard can be assessed even more precisely by means of comparison with the vehicle's own direction of movement and speed. Finally, the type of the object is also significant since, for example, a collision with a vehicle parked at the edge of the road is preferred to a collision with a pedestrian.

In a further preferred embodiment, there is provision that the threshold value is reduced in terms of the number of measurement cycles which are necessary to reach said value, during which number of measurement cycles the second information item is acquired. This speeds up the object detection or the object attribute detection since each measurement cycle is assigned a fixed computational time. Reducing the measurement cycles therefore reduces the necessary computational time up to the conclusion of the object attribute detection or the conclusion of the object attribute detection.

There is expediently provision that the threshold value is reduced in terms of the statistical probability, necessary to reach said value, of the at least one object and/or the at least one object attribute being detected in the sensor raw data. This likewise permits accelerated object detection or object attribute detection, which, in combination with the reduction in the number of measurement cycles necessary to reach the threshold value, brings about additional acceleration. Reducing the threshold value in terms of the statistical probability which is necessary to reach it provides the advantage that an object can be more quickly detected in the sensor raw data. It is therefore possible, for example, for an object or object attribute which is described by the first information item to serve as a target specification for the object detection or object attribute detection in the sensor raw data of the second information item. If the object or object attribute which is described by the first information item can be detected, in terms of its detection probability, only as one of a plurality of possible objects or object attributes in the sensor raw data, substantially reliable detection can be performed by virtue of the correspondingly reduced threshold values for the detection of the object or object attribute described by the first information item, even in the case of a comparatively low detection probability.

Furthermore it is advantageous that the at least one object and/or the at least one object attribute is detected in the sensor raw data of the second information item as soon as the threshold value of the object detection algorithm and/or of the object attribute detection algorithm is reached. This firstly provides the advantage that, as before, a threshold has to be reached at which the certainty is high enough to reliably detect an object or object attribute in the sensor raw data. The fact that the object or object attribute is detected when the threshold value is reached also provides the advantage that a reliable information item, which can be used, for example, to check the validity of further information items, is now available.

According to a further preferred embodiment of the invention there is provision that when the threshold value is reached, a description of the at least one detected object and/or of the at least one detected object attribute of sensor raw data form is converted into an evaluated data form. As a result, the information items which are detected with certainty are available in a data form which simplifies the further processing by different vehicle systems. For example, the detected information items can be made available to a driver assistance system.

Preferably there is provision that the validity of the at least one object and/or of the at least one object attribute is characterized as having been checked as soon as the threshold value of the object detection algorithm and/or of the object attribute detection algorithm is reached. Since the sensor raw data of the individual sensors or of the sensor group is, in any case, searched through for the objects or object attributes described by the first information item, and the said objects or object attributes are also detected when the threshold value is reached, information redundancy is therefore present when the threshold value is reached. A separate validity-checking process can therefore be dispensed with.

In a further preferred embodiment there is provision that the method is incorporated into a continuous sensor data fusion process, wherein each individual sensor makes available a separate second information item in each measurement cycle, or the sensor group makes available a multiplicity of second information items in each measurement cycle, wherein the sensor data fusion process compares objects and/or object attributes detected in the sensor raw data of the second information items with one another and/or supplements them and generates a common fusion information item in an evaluated data form, wherein the incorporation into the sensor data fusion process is carried out in such a way that objects and/or object attributes which are described in the first information item are compared and/or supplemented with the objects and object attributes detected in the sensor raw data of the second information items. This provides the advantage that an information profile, which is as complete as possible, of the vehicle surroundings can be generated in an individual fusion information item. A further advantage is that the fusion information item is present in an evaluated data form. This simplifies the further processing of the detected objects or object attributes by the different vehicle devices and driver assistance systems.

There is expediently provision that the at least one object whose validity is characterized as having been checked and/or the at least one object attribute whose validity is characterized as having been checked is made available in an evaluated data form to at least one driver assistance system, wherein the at least one driver assistance system is designed to warn a driver and/or to intervene in the vehicle control and/or to override a driver's prescription. The objects or object attributes whose validity is characterized as having been checked constitute reliable bases for the outputting of a warning to the driver or even for autonomous interventions in the vehicle control. As a result, incorrect warnings are avoided and a hazardous situation or a traffic accident can be averted, under certain circumstances even without the involvement of the driver.

The invention also relates to a system for accelerated object detection and for accelerated object attribute detection. The system comprises a vehicle-to-X communication device for acquiring a first information item, wherein the first information item describes at least one object and/or at least one object attribute in an evaluated data form, and at least one individual sensor or a sensor group for acquiring a second information item, wherein the second information item describes at least one object and/or at least one object attribute in a sensor raw data form.

Furthermore, the system comprises an analysis device, which is coupled at a data level to the vehicle-to-X communication device and to the at least one individual sensor or the sensor group and implements an object detection algorithm and/or an object attribute detection algorithm and applies it to sensor raw data of the second information item. The system according to the invention is defined by the fact that the analysis device reduces a threshold value of the object detection algorithm and/or object attribute detection algorithm in order to detect the at least one object described by the first information item and/or at least one object attribute in the sensor raw data of the second information item. The system according to the invention therefore comprises all the necessary means for carrying out the method according to the invention, and easily permits accelerated object detection or object attribute detection in the sensor raw data of the individual sensor or of the sensor group. This results in the advantages already described.

The system is preferably defined by the fact that the analysis device comprises an electronic computational unit which carries out at least some of the computational operations for vehicle devices which are different from the analysis device. This provides the advantage that not every vehicle device has to be provided with a separate computational unit, which both simplifies the manufacturing process and reduces the production costs. The computational unit which is included in the analysis device can be structurally assigned either to the analysis device itself or else to a vehicle device which is different from the analysis device. The fact that different vehicle devices jointly access the same computational unit also results in an effective and rapid combination of data of the corresponding vehicle devices.

Furthermore, it is advantageous that when the threshold value is reached, the analysis device converts a description of the at least one detected object and/or the at least one detected object attribute from a sensor raw data form into an evaluated data form. This simplifies the further processing of the reliably detected information items.

Preferably there is provision that the analysis device additionally carries out a continuous sensor data fusion process, wherein each individual sensor makes available a separate second information item in each measurement cycle, or the sensor group makes available a multiplicity of second information items in each measurement cycle, wherein the sensor data fusion process compares objects and/or object attributes detected in the sensor raw data of the second information items with one another and/or supplements them and generates a common fusion information item in an evaluated data form, wherein the analysis device compares and/or supplements objects and/or object attributes described in the first information item with the objects and/or object attributes detected in the sensor raw data of the second information items. This generates an information profile of the vehicle surroundings which is as complete as possible, in just a single fusion information item. Since the fusion information item is additionally present in an evaluated data form, the further processing by corresponding driver assistance systems and vehicle devices is simplified.

Preferably there is provision that the at least one individual sensor or the sensor group acquires the second information item on the basis of at least one of the following operational principles:

lidar,
radar,
a camera, and
ultrasonic sound.

These are sensor types which are typically used in the field of motor vehicles and essentially permit comprehensive sensing and detection of the vehicle surroundings. At the present time, a large number of vehicles are already equipped with a plurality of sensors of the specified types on a standard basis, and this number will increase further in future. The additional equipment expenditure for implementing the method according to the invention in a motor vehicle is therefore low.

It is advantageous that the vehicle-to-X communication device acquires the first information item on the basis of at least one of the following types of connection:

WLAN connection, in particular according to IEEE 802.11,
ISM connection (Industrial, Scientific, Medical Band),
Bluetooth,
ZigBee,
UWB,
WiMax,
infrared link, and
mobile radio link.

These types of connection provide different advantages and disadvantages here, depending on the type and wavelength. WLAN connections permit, for example, a high data transmission rate and a rapid connection setup. In contrast, ISM connections provide only a relatively low data transmission rate, but are outstandingly suitable for transmitting data around obstructions. Infrared links again also provide a low data transmission rate. Finally, mobile radio links are not adversely affected by obstructions and provide a good data transmission rate. However, the connection setup is comparatively slow for these. Further advantages are obtained by combining and using a plurality of these types of connections simultaneously or in parallel, since in this way the disadvantages of individual types of connection can be compensated.

Furthermore, the present invention relates to a use of the method for accelerated object detection and/or for accelerated object attribute detection in a motor vehicle.

BRIEF DESCRIPTION OF THE DRAWINGS

Further preferred embodiments emerge from the following description of an exemplary embodiment with reference to figures.
In the drawings.

ADDITIONAL DETAILED DESCRIPTION OF THE INVENTION

Figure 1:
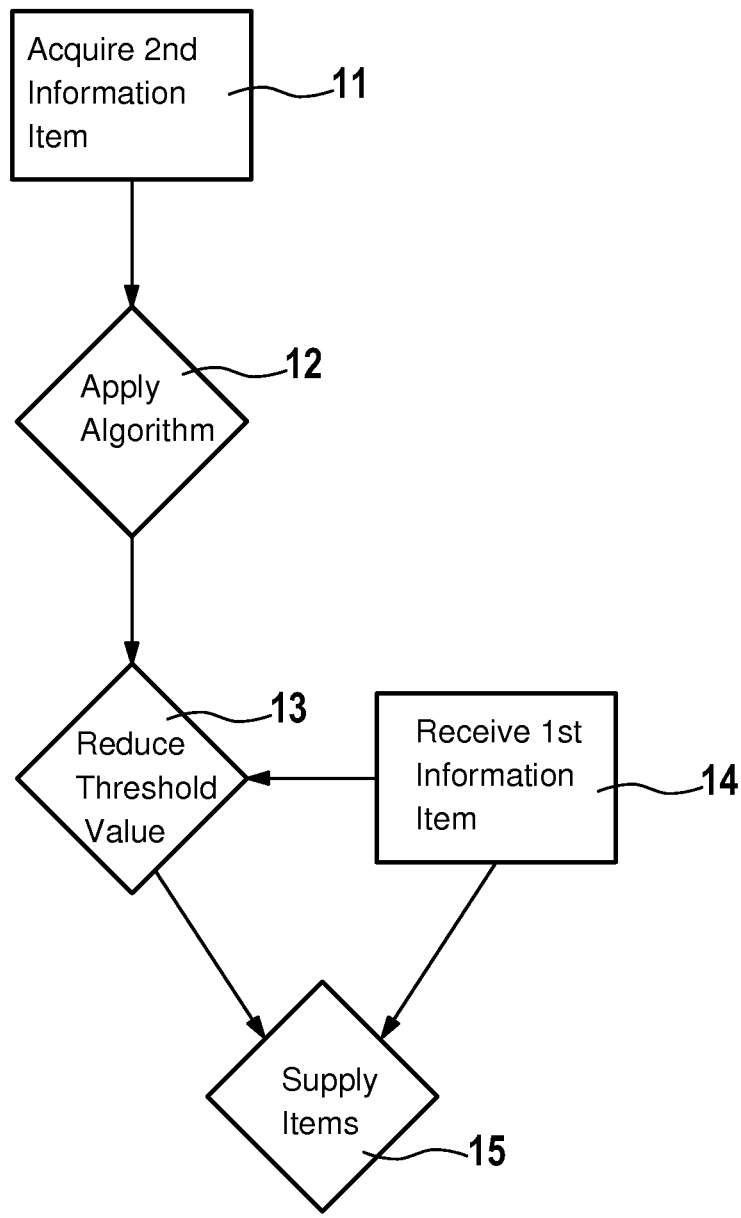
FIG. 1 shows a flowchart illustrating the individual sequence steps of a possible embodiment of the method according to the invention,
FIG. 2 with FIGS. 2a and 2b show a traffic situation in which the method according to the invention is used.

FIG. 1 shows an exemplary and schematic sequence of the method according to the invention in the form of a flowchart. In step 11, a second information item is acquired in a sensor raw data form by means of a surroundings sensor system. Said information relates, for example, to the existence and the position of an object. In the following step 12, an object detection algorithm and an object attribute detection algorithm are then applied to the sensor raw data of the second information item. Since a first information item is received in step 14 by means of vehicle-to-X communication, in step 13 a corresponding threshold value of the object detection algorithm for detecting the object described by the first information item and an object attribute detection algorithm for detecting the position thereof is reduced. Since the first information item and the second information item describe, for example, the same object at the same position, the reduced threshold value for object detection is already reached by the surroundings sensor system after just one measurement cycle. As soon as the reduced threshold value of the object detection algorithm and the reduced threshold value of the object attribute detection algorithm have been reached, the object described and its position are considered to be detected. In step 15, both the first information item received by means of vehicle-to-X communication and the second information item which is acquired by means of the surroundings sensor system are supplied to a sensor data fusion process.

FIG. 2a illustrates an exemplary traffic situation in which the method according to the invention is used. Vehicle 22 begins a braking process and transmits the deceleration value, measured by an acceleration sensor, to the following vehicle 21 by means of vehicle-to-X communication. Vehicle 21 is equipped with the system according to the invention for accelerated object detection and/or for accelerated object attribute detection and uses the deceleration value, received by means of vehicle-to-X communication, for reducing corresponding threshold values for an object attribute detection algorithm in the sensor raw data of a camera sensor and of a radar sensor. Both the camera sensor and the radar sensor sense a deceleration of the vehicle 22 but the value of said deceleration cannot initially be determined precisely. With the description of the value received via the vehicle-to-X communication, the transmitted deceleration is already detected in the sensor raw data after a few measurement cycles, and the vehicle-to-X information can be confirmed.

Figure 3:
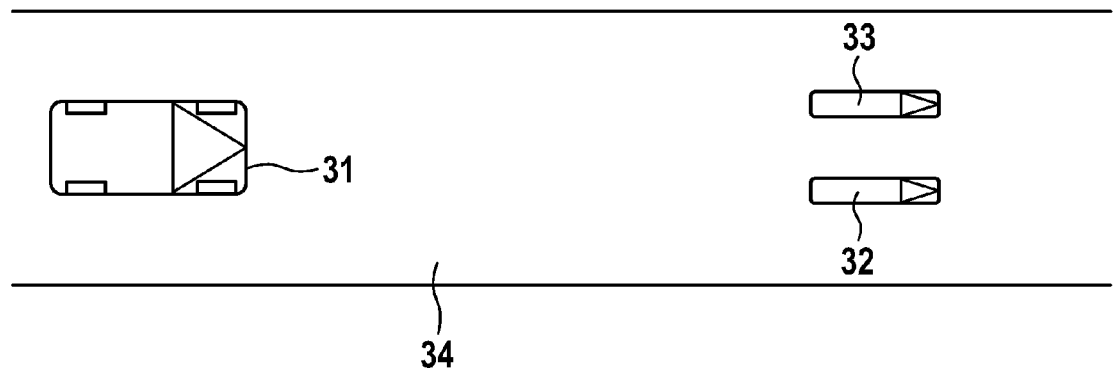
FIG. 3 shows a further traffic situation in which the method according to the invention is used.

The exemplary embodiment in FIG. 3 illustrates schematically a road 34 with a vehicle 31 and motor bikes 32 and 33. The vehicle 31 follows the motor bikes 32 and 33 in the direction of travel. The vehicle 31 has the system according to the invention for accelerated object detection and/or for accelerated object attribute detection. By means of the associated vehicle-to-X communication device, the vehicle 31 receives regular identification messages and position messages from the motor bikes 32 and 33. The acquired first information items therefore describe two motor bikes 32 and 33 which are, for example, travelling closely next to one another. Second information items in a sensor raw data form are generated by means of a radar sensor which is also present in the vehicle 31. However, since the motor bikes 32 and 33 are travelling closely one next to the other, in the sensor raw data the statistical probability of the detection of a relatively large individual object is higher than the statistical probability of the detection of two relatively small individual objects which are positioned closely one next to the other. However, within the scope of the method according to the invention the threshold value of the object detection algorithm is reduced in terms of the statistical probability, necessary to reach said value, of the motor bikes 32 and 33 being detected. The threshold value for the detection of two individual objects, specifically the motor bikes 32 and 33, is therefore already reached before the threshold value for detecting just one individual object. The information is subsequently converted into evaluated data form and made available to various driver assistance systems.

A further exemplary embodiment of the invention is illustrated again in FIG. 2. In FIG. 2b, the driver of the vehicle 22 activates the brake pedal. The activation of the brake pedal is transmitted at the same time as the pressure buildup in the brake system from vehicle 22 by means of a vehicle-to-X communication device to vehicle 21. Vehicle 21 is equipped with the system according to the invention and receives the information about the incipient braking process before said braking process starts and therefore even before said braking process could be detected by a mono-camera sensor which is present in the vehicle 21 or a lidar sensor which is also present. Since the information has been acquired exclusively by means of the vehicle-to-X communication device, and it has not yet been possible to check its validity by means of further sensors, in FIG. 2a at first only a warning is output to the driver of vehicle 21. At the same time, threshold values in an object detection algorithm and an object attribute detection algorithm in the sensor raw data of the camera sensor and of the lidar sensor for detecting the deceleration transmitted by means of vehicle-to-X communication are reduced. As soon as the reduced threshold value for detecting the braking process of vehicle 22 is reached the validity of the corresponding vehicle-to-X information is checked, and the information whose validity has been checked is made available to an autonomous braking assistant in vehicle 21. Since the driver of vehicle 21 does not react to the warning which is output and continues to approach at high speed the vehicle 22 which is decelerating, the braking assistant carries out an autonomous braking intervention in order to prevent a rear-end accident.

In a further exemplary embodiment (not illustrated) a driver of a vehicle intends to cut into his original lane again after an overtaking process and correspondingly activates the flashing indicator light in order to display this. As a result of the flashing indicator light being activated, an information item indicating that a change of lane is intended is automatically transmitted by means of vehicle-to-X information. A further vehicle which receives this vehicle-to-X information reduces the threshold value of an object attribute detection algorithm in order to be able to detect the lane change more quickly. Since a radar sensor in the receiving vehicle then senses a slight lateral speed of the vehicle whose indicator light is flashing, the lane change of the vehicle whose indicator light is flashing is considered to be detected.

According to a further exemplary embodiment (likewise not illustrated), the system according to the invention acquires first information items by means of a vehicle-to-X communication device, and second information items by means of a camera sensor. An image processing algorithm of the camera sensor generates object hypotheses which describe types of vehicle sensed by the camera sensor. In a subsequent step, these object hypotheses are confirmed or rejected by means of learnable classifiers, which are, for example, neural networks. However, owing to the large variety of geometric characteristics of various types of vehicle, reliable detection is nevertheless not always possible. Therefore, for example by means of the first information item a type of vehicle is already transmitted, after which a classifier which is specifically adapted to the type of vehicle which is transmitted is used. This leads to a more reliable and faster detection of a type of vehicle by the camera sensor.

In a further exemplary embodiment a camera sensor is also used to detect a type of vehicle. The camera sensor is assigned to a system according to the invention. Instead of the use of a classifier which is specifically adapted to a type of vehicle, in this exemplary embodiment a threshold value for the classification reliability in an object attribute detection algorithm is reduced. This also increases the reliability and the speed of the object detection.

A further example for carrying out the method according to the invention provides for the use of the system according to the invention within the scope of an intelligent adaptive cruise controller. By reducing corresponding threshold values on the basis of a vehicle-to-X information item, the speed and acceleration of a vehicle travelling ahead can be detected solely by means of a camera sensor. This exemplary embodiment therefore describes a very cost-effective possibility for implementing an intelligent adaptive cruise controller which is known per se.

According to a further exemplary embodiment, information about the activation of a flashing indicator light, received by means of vehicle-to-X communication, in the case of a vehicle travelling ahead is used to detect, within the scope of an intelligent adaptive cruise controller, whether a vehicle travelling ahead intends to change onto the lane of the driver's own vehicle. The information about the intended lane change is used to reduce the corresponding threshold value of an object detection algorithm which is applied to the sensor raw data of a radar sensor. Since a radar sensor can only detect a lateral movement with difficulty, without the method according to the invention, for example more convenient adaptive cruise control is possible.

FIG. 2 shows a further exemplary embodiment of the invention. Vehicle 22 is the last vehicle in a traffic jam, and vehicle 21 is approaching at high speed. Vehicle 21 has the system according to the invention and is equipped with a radar sensor and a camera sensor. The sensor range of the radar sensor is, for example, 200 m, that of the camera sensor is, for example, only 60 m. Therefore, without the method according to the invention, it would not be possible to generate an information item about an imminent rear-end accident whose validity has been checked until at a distance of only 60 m from the end of the traffic jam. However, the vehicle 21 receives, by means of vehicle-to-X communication an information item from vehicle 22 which describes that vehicle 22 constitutes the end of a traffic jam.

Owing to the correspondingly reduced threshold value of the object detection algorithm which is applied to the sensor raw data of the radar sensor, a stationary vehicle is detected as soon as the sensor range of the radar sensor is reached and the validity of this information is immediately checked. The distance of 200 m which remains at the time of object detection and checking of the validity of information is sufficient to brake vehicle 21 safely and prevent an accident.

Figure 4:
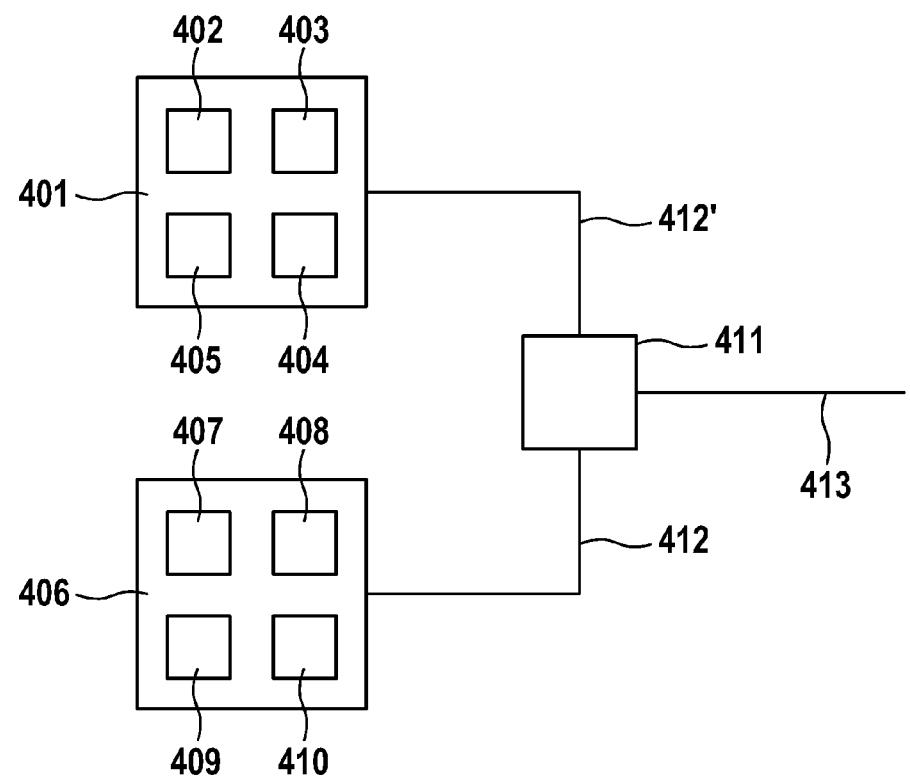
FIG. 4 is a schematic view of a possible design of the system according to the invention.

FIG. 4 shows by way of example a schematic view of a possible design of the system according to the invention. The exemplary system is composed of a vehicle-to-X communication device 401, which comprises WLAN connecting means 402 according to the IEEE standard 802.11p, ISM connecting means 403, infrared connecting means 404 and mobile radio connecting means 405. Furthermore, the exemplary system is composed of a sensor group 406 which comprises a lidar sensor 407, radar sensor 408, mono-camera sensor 409 and ultrasonic sound sensors 410. The vehicle-to-X communication device 401 and sensor group 406 with analysis device 411 are coupled via data lines (wire-bound or wireless) 412 and 412'. The analysis device 411 applies an object detection algorithm and an object attribute detection algorithm to the information items acquired by the sensor group 401, said information being present in a sensor raw data form. For accelerated object detection and accelerated object attribute detection, threshold values of the object detection algorithm and of the object attribute detection algorithm for detecting objects and object attributes which have already been described by means of the vehicle-to-X communication device in the sensor raw data are reduced. When a threshold value is reached, the analysis device 411 detects an object or an object attribute in the sensor raw data of the sensor group 401 and checks the validity of the corresponding information items. The sensor raw data is subsequently converted into an evaluated data form by the analysis device 411, and is made available, together with the vehicle-to-X information, to a driver assistance system (not illustrated) via a data line (wireless or wire-bound) 413.

While the above description constitutes the preferred embodiment of the present invention, it will be appreciated that the invention is susceptible to modification, variation and change without departing from the proper scope and fair meaning of the accompanying claims.

The invention claimed is:

1. A method for accelerated object detection or for accelerated object attribute detection, or both for a motor vehicle comprising the steps of:
   acquiring a first information item by providing a vehicle-to-X communication device,
   wherein the first information item describes at least one object or at least one object attribute in an evaluated data form,
   acquiring a second information item by providing at least one individual sensor or a sensor group, wherein the second information item describes the at least one object or the at least one object attribute in sensor raw data form, wherein an object detection algorithm or an object attribute detection algorithm is applied to sensor raw data of the second information item, wherein a threshold value of the object detection algorithm or of the object attribute detection algorithm for detecting the at least one object or at least one object attribute described by the first information item is reduced in the sensor raw data of the second information item, and the threshold value is reduced in terms of the number of measurement cycles which are necessary to reach the threshold value, during which number of measurement cycles the second information item is acquired or the threshold value is reduced in terms of the statistical probability necessary to reach said value of the at least one object a or the at least one object attribute being detected in the sensor raw data.

2. The method as claimed in claim 1, further comprising in that the object detection algorithm detects the existence of an object or the object attribute detection algorithm detects at least one of, a direction of movement of the object, a relative position of the object, an absolute position of the object, a speed of the object, and a type of the object.

3. The method as claimed in claim 1, further comprising in that the at least one object or the at least one object attribute is detected in the sensor raw data of the second information item as soon as the threshold value of the object detection algorithm or of the object attribute detection algorithm is reached.

4. The method as claimed in claim 1, further comprising in that when the threshold value is reached, a description of the at least one detected object or of the at least one detected object attribute of sensor raw data form is converted into an evaluated data form.

5. The method as claimed in claim 1, further comprising in that the validity of the at least one object or of the at least one object attribute is characterized as having been checked as soon as the threshold value of the object detection algorithm or of the object attribute detection algorithm is reached.

6. The method as claimed in claim 1, further comprising in that the method is incorporated into a continuous sensor data fusion process, wherein each of the individual sensor makes available a separate of the second information item in each of a plurality measurement cycles, or the sensor group makes available a multiplicity of second information items in each of the measurement cycle, wherein the sensor data fusion process compares objects or object attributes detected in the sensor raw data of the second information items with one another or supplements them and generates a common fusion information item in an evaluated data form, wherein the incorporation into the sensor data fusion process is carried out in such a way that objects or object attributes which are described in the first information item are compared or supplemented with the objects and object attributes detected in the sensor raw data of the second information items.

7. The method as claimed in claim 1, further comprising in that the at least one object whose validity is characterized as having been checked or the at least one object attribute whose validity is characterized as having been checked is made available in an evaluated data form to at least one driver assistance system, wherein the at least one driver assistance system is designed to warn a driver or to intervene in the vehicle control or to override a driver's action.

8. The use of the method as claimed in claim 1 in a motor vehicle.

9. The method as claimed in claim 1 further comprising providing in that the at least one individual sensor or the sensor group acquires the second information item on the basis of at least one of the following operational principles:
   lidar,
   radar,
   a camera, and
   ultrasonic sound.

10. The method as claimed in claim 1 further comprising in that the vehicle-to-X communication device acquires the first information item on the basis of at least one of the following types of connection:
   WLAN connection,
   ISM connection (Industrial, Scientific, Medical Band),
   Bluetooth,
   ZigBee,
   UWB,
   WiMax,
   infrared link, and
   mobile radio link.

11. A system for accelerated object detection or for accelerated object attribute detection, or both, comprising:
   a vehicle-to-X communication device for acquiring a first information item,
   wherein the first information item describes at least one object or at least one object attribute in an evaluated data form,
   at least one individual sensor or a sensor group for acquiring a second information item, wherein the second information item describes at least one object or at least one object attribute in a sensor raw data form, and an analysis device, which is coupled at a data level to the vehicle-to-X communication device and to the at least one individual sensor or the sensor group,
   wherein the analysis device implements an object detection algorithm or an object attribute detection algorithm and applies the algorithm to sensor raw data of the second information item, in that the analysis device reduces a threshold value of the object detection algorithm or object attribute detection algorithm in order to detect the at least one object described by the first information item or at least one object attribute in the sensor raw data of the second information item, and
   the threshold value is reduced in terms of the number of measurement cycles which are necessary to reach the threshold value, during which number of measurement cycles the second information item is acquired or the threshold value is reduced in terms of the statistical probability necessary to reach said value of the at least one object a or the at least one object attribute being detected in the sensor raw data.

12. The system as claimed in claim 11, further comprising in that the analysis device comprises a part of an electronic computational unit which carries out at least some of the computational operations for vehicle devices which are different from those carried out by the analysis device.

13. The system as claimed in claim 11, further comprising in that when the threshold value is reached, the analysis device converts a description of the at least one detected object or the at least one detected object attribute from the sensor raw data form into an evaluated data form.

14. The system as claimed in claim 11, further comprising in that the analysis device additionally carries out a continuous sensor data fusion process, wherein each of the sensors makes available the second information item in each measurement cycle of a plurality of measurement cycles, or the sensor group makes available a multiplicity of second information items in each of the measurement cycle, wherein the sensor data fusion process compares objects and/or or object attributes detected in the sensor raw data of the second information items with one another or supplements them and generates a common fusion information item in an evaluated data form, wherein the analysis device compares or supplements objects or object attributes described in the first information item with the objects or object attributes detected in the sensor raw data of the second information items.

15. The system as claimed in claim 11, further comprising in that the at least one individual sensor or the sensor group acquires the second information item on the basis of at least one of the following operational principles:
 lidar, radar, a camera, and ultrasonic sound.

16. The system as claimed in claim 11, further comprising in that the vehicle-to-X communication device acquires the first information item on the basis of at least one of the following types of connection:
 WLAN connection, ISM connection (Industrial, Scientific, Medical Band), Bluetooth, ZigBee, UWB, WiMax, infrared link, and mobile radio link.

\* \* \* \* \*